Figure 1:
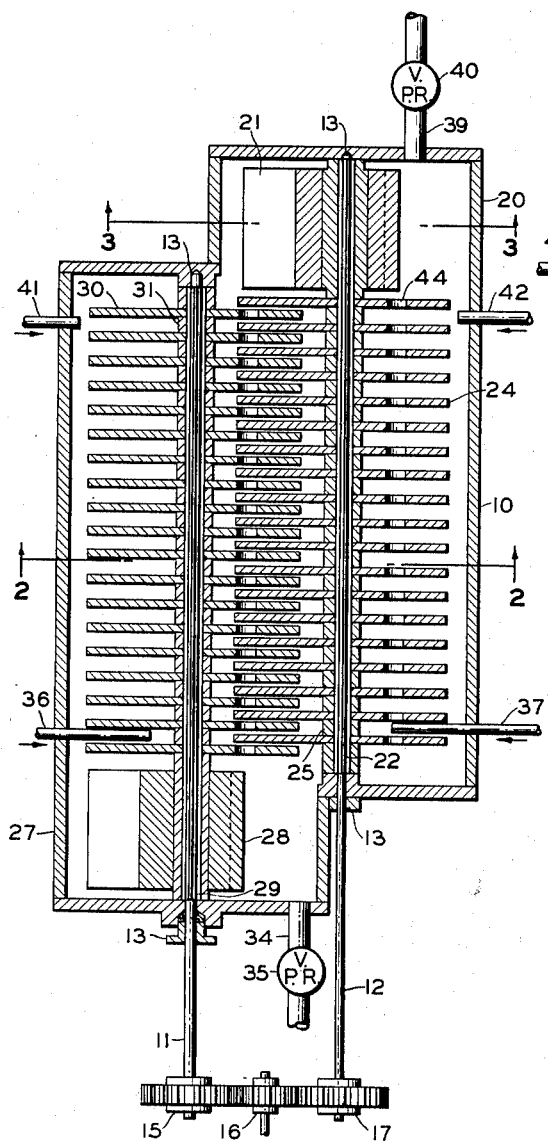

Feb. 9, 1954  S. C. CARNEY  2,668,756
METHOD OF AND APPARATUS FOR LIQUID-LIQUID CONTACTING
Filed Sept. 27, 1948

INVENTOR.
S. C. CARNEY
BY *Hudson & Young*
ATTORNEYS

Patented Feb. 9, 1954

2,668,756

UNITED STATES PATENT OFFICE 2,668,756

METHOD OF AND APPARATUS FOR LIQUID-LIQUID CONTACTING

Samuel C. Carney, Bartlesville, Okla., assignor to Phillips Petroleum Company, a corporation of Delaware Application September 27, 1948, Serial No. 51,405

6 Claims. (Cl. 23—310)

This invention relates to a method of liquid-liquid contacting and to apparatus for carrying out said method.

In treating operations, wherein hydrogen sulfide or mercaptans are removed from natural hydrocarbons or wherein aluminum halide catalyst is removed from synthetic hydrocarbons, very complete contact of the two liquids is important. Complete contacting is also important in alkylation processes to mix the reactants with catalyst materials, and in various types of extraction processes.

In liquid-liquid extraction, one or more components of a liquid feed mixture are selectively dissolved in a second liquid known as a solvent. This process provides an efficient method for separating various hydrocarbon mixtures, such as close boiling paraffins and naphthenes which cannot be separated by fractionation. Liquid-liquid extraction is presently carried out in various types of mechanical mixers, packed columns, and in spray towers. Countercurrent contact is obtained in the packed columns and spray towers by dispersing one of the liquids which becomes the dispersed phase and allowing it to pass through a second liquid known as the continuous phase. If the feed liquid mixture is the dispersed phase and the solvent the continuous phase, the transfer of one or more components of the feed mixture to the solvent is accomplished at the interfacial contact between the two liquids, the greater the interfacial surface, the higher the rate of transfer. In spray towers the transfer between the two phases is accomplished through the interfacial area of the dispersed drops, but the components within the drop must diffuse to the surface before transfer can be made; and, consequently, several feet of tower height are required to obtain an equilibrium extraction stage.

With respect to mechanical mixers, such contacting has been accomplished in multi-stage centrifugal pumps with open impellers so as to obtain maximum slippage or, alternatively, contactors of various designs have been utilized, some of which have a plurality of discs attached to a rotating shaft with vanes or ribs protruding from the discs. Such apparatus has not been completely successful on a practical and commercial scale since the mixing of the two liquids is too intimate, thereby producing a dispersion which is difficult to separate.

It has also been proposed in liquid-liquid contacting to utilize simultaneous dispersion of both phases rather than the dispersion of one phase as fine drops in another liquid known as the continuous phase. Although this substantially increases the area of the contacting surfaces, completely satisfactory contacting is not obtained. Although simultaneous dispersion of the two phases produces a large area of contact between the phases, it is also necessary, in order to obtain efficient contacting, that, in addition, the phases shall move at high velocity relative to each other at the interface, and that there shall be a relatively thin layer of like molecules of each phase behind that interface.

It is an object of this invention to provide a method and apparatus for producing a high velocity of interfacial contact together with a large interfacial area and to insure that there is only a relatively thin layer of like molecules of each phase behind the interface.

It is a further object to provide such contacting with means whereby the liquids to be contacted move in a countercurrent manner through the apparatus.

It is a further object of the invention to utilize centrifugal force to obtain the separation of the phases necessary for countercurrent flow, thereby providing an interface between the liquids to be contacted, and to provide means for controlling the location of the interface.

It is a still further object of the invention to provide intimate contacting between the two phases without disturbing the location of the interface, thereby allowing countercurrent contacting of the two phases.

It is a still further object of the invention to provide apparatus which is of simple construction, reliable in operation, rugged and durable.

Figure 2:
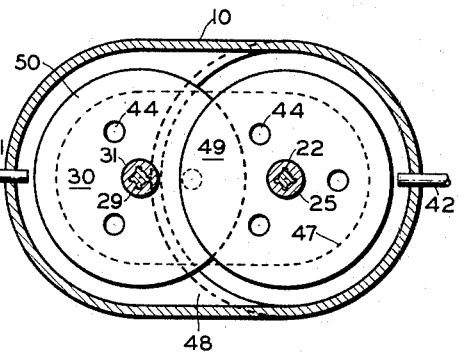
Figure 3:
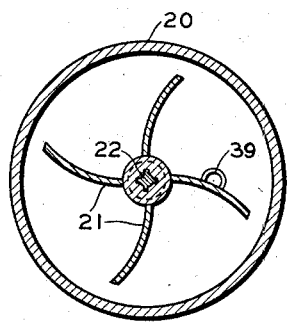

Various other objects, advantages and features of the invention will become apparent from the following detailed description taken in conjunction with the accompanying drawings, in which:

Figure 1 is a vertical sectional view of the contacting apparatus of this invention; and Figures 2 and 3 are, respectively, sectional views taken along the lines 2—2 and 3—3 of Figure 1.

Referring now to the drawings in detail, and particularly to Figure 1, the apparatus includes a vessel 10 of generally elliptical cross section having a pair of shafts 11, 12 journalled therein by bearings 13. The shafts extend longitudinally through the vessel and they are disposed in parallel spaced arrangement. Shafts 11 and 12 are adapted to be rotated in the same direction by any suitable power source, not shown, and, to this end, shaft 11 carries a gear 15 meshing with an idler gear 16 which, in turn, meshes with a gear 17 carried by shaft 12.

A chamber 20 of circular cross section is located at the top of the vessel and this chamber carries a circular impeller 21 which is suitably secured to a splined portion 22 at the upper end of shaft 12. A series of thin flat metal discs 24 are mounted on the shaft 12 below impeller 21 and these discs are maintained in proper spaced relation on the splined portion 22 by spacers 25.

The lower end of vessel 10 is shaped to define a chamber 27 of circular cross section and this chamber carries an impeller 28 which is mounted on a splined portion 29 of shaft 11. A series of discs 30 is mounted on the splined portion 29 above impeller 28 and these discs are maintained in proper spaced relation along the shaft by spacers 31. It will be noted that the inner surfaces of the two series of discs are mounted in interlaced overlapping relation and it will be apparent that the amount of overlapping may be adjusted by varying the spacing of shafts 11, 12 or by varying the size of the discs.

An outlet 34 is provided for removing heavy liquid from the peripheral region of chamber 27 and this outlet is provided with a pressure regulating valve 35. A pair of inlet pipes 36, 37 are provided for passing light liquid into the bottom portion of the vessel 10 and this liquid is preferably discharged within the region between the two lower most discs upon each of the shafts 11 and 12. An outlet 39 communicates with the central region of chamber 30 and this outlet is adapted to withdraw light liquid from the upper region of vessel 10, the back pressure at this inlet being regulated by a valve 40. A pair of conduits 41, 42 are provided for admitting heavy fluid to the top region of the vessel 10 and it will be noted that these inlets communicate with diametrically opposite peripheral regions of the vessel. Each of the discs 24, 30 is provided with a series of openings 44 to allow longitudinal flow of light liquid in the manner hereinafter described.

The operation of the described apparatus will now be apparent to those skilled in the art. Assuming that the vessel 10 is filled with a mixture of heavy and light liquids to be contacted, and that shafts 11, 12 are rotated in the same direction by any suitable power source, not shown, the centrifugal action of the discs will cause the lighter of the two liquids to move toward the central region of the apparatus, and the heavier liquid will be forced to the peripheral region of the apparatus. Referring to Figure 2, an interface or neutral zone 47 will be established by such rotary movement of the discs, thereby separating the contents of the vessel into a body or continuous phase of heavy liquid within the region 48 and a body or continuous phase of light liquid within the region 49. Thereupon, light liquid is admitted through inlets 36, 37 and this liquid passes upwardly through the openings 44 in the discs to the upper chamber 20 and thence through outlet 39 at controlled back pressure. Heavy liquid admitted through inlets 41, 42 passes downwardly through the peripheral regions of the vessel in countercurrent flow to the light liquid, and thence passes through chamber 27 to outlet 34 at a controlled back pressure. The differential between the back pressures at outlets 34 and 39 may be controlled to regulate the location of interface 47, Figure 2. Thus, if the back pressure at outlet 34 is very high as compared to the back pressure at outlet 39, the interface will be moved inwardly toward the central region of the vessel. In contrast, if the back pressure on outlet 39 is very high as compared to the back pressure on outlet 34, the interface will be located closer to the outer wall of the vessel than is indicated by Figure 2.

When the speed of rotation of the discs is such that dispersion of the two phases does not occur faster than the separation thereof resulting from centrifugal force, the light liquid surrounding the two shafts joins in one roughly elliptical area, as shown by Figure 2. This results from the superposed relation of the two series of discs and from the fact that they are rotated in the same direction so that the heavy liquid is urged by the greater part of the disc area to move in an elliptical zone next to the wall of the vessel.

In accordance with the invention, portions of the discs 24 and 30 move alternately into contact with the body of heavy liquid 48 and the body of light liquid 49. As the discs alternately pass through these two bodies of liquid, a film of one liquid is formed thereon and this film is abruptly plunged through the interface into the other body of liquid. The formation of such films is due to strong intermolecular forces which act, however, through short distances. In particular, the outer region 50 of the disc 30 shown in Figure 2 acquires a film of heavy liquid as it passes adjacent the walls of the vessel 10. This film of heavy liquid is then plunged through the interface 47 into the body of light liquid 49 as the portion 50 of the disc passes through the interface into the overlapping region between the discs. As the portion 50 of the disc passes through the overlapping region, the film of heavy liquid is removed and replaced by a film of light liquid which is, in turn, plunged through the interface into the body 48 of heavy liquid as the disc continues to rotate. A similar action occurs at each of the discs 24 and 30 and the contacting is very efficient since the discs rotate at high velocity and are very thin. In fact, in some cases, the films may be of substantially monomolecular thickness.

Accordingly, it will be apparent that the light and heavy liquid phases are held separate and the location of the interface between them is fixed by centrifugal force so that they may be moved countercurrent to each other. During this countercurrent movement, the liquid bodies are alternately cut by large solid surfaces moving at high velocity and carrying a liquid film, to provide a very efficient contacting action. The spacing of the discs on the shaft, the area of overlap and diameter of the discs, the speed of rotation, and location of interface are so adjusted that the filmed surfaces do not disperse a greater amount of one of each phase into the other than is returned to the respective undispersed phases by the action of centrifugal force. Accordingly, the contacting may be carried out efficiently and in a countercurrent manner without the emulsification of the liquids being treated. The mixing action obtained is superior to that obtained by drop dispersion, since the disc surfaces carrying liquid films which are in motion relative to the solid surfaces and which are being continuously worn off and replaced may be moved relative to the other liquid at a velocity far greater than can be attained by free drops suspended and moving under the influence of gravity or centrifugal force. The function of the impellers 21, 28 is to provide zones of unhindered centrifugal separation adjacent the outlets 34 and 39.

Thus, the apparatus of the subject invention locity from a region within one liquid phase spaced from the interface through the interface into a region of the other liquid spaced from the interface at various locations throughout the mixing zone.

5. In the art of liquid-liquid contacting, the steps which comprise admitting light liquid and withdrawing heavy liquid at one end of a mixing zone, admitting heavy liquid and withdrawing light liquid at the other end of said mixing zone, centrifuging the liquids to continuously separate them as they pass through the mixing zone in such manner that an interface of elliptical cross section is formed between bodies of light and heavy liquids, forming a film of light liquid at several spaced areas throughout the mixing zone, passing said films of light liquid from several regions within the light liquid phase spaced from the interface through the interface into regions of the heavy liquid phase spaced from the interface, forming films of heavy liquid at several regions of the heavy liquid phase spaced from the interface, and passing said films of heavy liquid through the interface into regions of the light liquid phase spaced from said interface.

6. In the art of liquid-liquid contacting, the steps which comprise effecting countercurrent flow of a light liquid and a heavy liquid through a mixing zone, centrifuging the liquids as they pass through the mixing zone to establish an interface between the light and heavy liquids, and continuously passing a film of one liquid at high velocity from a region within the body of said one liquid spaced from the interface through the interface into a region of the body of the other liquid spaced from said interface.

SAMUEL C. CARNEY.

References Cited in the file of this patent

UNITED STATES PATENTS

| Number | Name | Date |
| --- | --- | --- |
| 1,845,128 | Cochran | Feb. 16, 1932 |
| 2,000,606 | Othmer | May 7, 1935 |
| 2,063,789 | Burk | Dec. 8, 1936 |
| 2,072,382 | Robinson | Mar. 2, 1937 |
| 2,248,620 | Freedman et al. | July 8, 1941 | provides a means for obtaining continuous countercurrent liquid-liquid extraction with increased efficiency by substantially increasing the interfacial area. As a specific example, a relatively heavy liquid such as furfural is introduced to the periphery of contacting vessel 10 through lines 41 and 42 and passes downwardly in countercurrent contact with a relatively lighter liquid such as a hydrocarbon mixture comprising paraffins and naphthenes which is introduced to the central area through lines 36 and 37. As these two liquids pass through vessel 10, they are caused to rapidly rotate and at the same time are repeatedly cut by the rapidly revolving discs 24 and 30. The rotation causes the furfural to form an outer layer 48 and the light hydrocarbon mixture to form an inner body 49 with the interface at 47. The location of this interface may be controlled by adjusting the differential pressure between valves 35 and 40. When the discs are in area 49, they become coated with a film of hydrocarbon which is carried through interface 47 into the furfural. Thus, a large interfacial area is established between the rapidly moving hydrocarbon film which may approach a monomolecular layer on the disc and the furfural, thereby resulting in a rapid transfer of constituents to the furfural. In some liquid-liquid systems, one liquid will preferentially wet the surface of the discs, in which case the film on the discs passes through the other liquid and returns to the wetting liquid to be replaced by a new film. In other systems, the film of the first liquid is removed and becomes dispersed in the second liquid, which also replaces the film and becomes dispersed in the first liquid, in which case the dispersed liquids are immediately separated by the centrifugal action. In either case, a rapidly moving film of liquid is brought into contact with a second liquid through a large interfacial area. Thus, equilibrium may be obtained in a relatively short distance. In the furfural hydrocarbon system, the furfural passing downwardly becomes increasingly richer in naphthenes and finally passes through chamber 27 for the separation of any entrained hydrocarbons, and thence through line 34 as the extract which is passed to a suitable separation means for the recovery of the naphthenes as the extract product and the furfural as the solvent to be recycled. The hydrocarbon mixture passing upwardly through holes 44 becomes denuded of naphthenes and finally passes to chamber 20 for the separation of furfural, and thence through line 39 as the raffinate which may require treatment for the recovery of furfural. In some applications, it may be desirable to recycle either a quantity of the raffinate to the top portion of vessel 10 or a quantity of the extract to the lower portion as reflux. Likewise, the solvent may be introduced at a plurality of vertically spaced points along vessel 10.

The method and apparatus of the subject invention may also be advantageously applied to a wide variety of operations in the petroleum industry which are generally termed treating processes. In each of these processes, a liquid containing some dissolved constituents such as hydrogen sulfide, mercaptans, a Friedel-Crafts type catalyst, sulfuric acid, or other impurities or refining agents is contacted with a suitable solvent which dissolves or reacts with the dissolved constituents. At present these treating operations are practiced in a variety of apparatus, such as centrifugal pumps, jets, turbo mixers, etc. There are numerous difficulties resulting from both too intimate contact and lack of efficient contact between the two liquids.

While the invention has been described in connection with a present, preferred embodiment thereof, it is to be understood that this description is illustrative only and is not intended to limit the invention, the scope of which is defined by the appended claims.

Having described my invention, I claim:

1. In a liquid-liquid contacting apparatus, a vessel having a pair of spaced, parallel shafts journalled therein, a series of discs spaced axially along one of said shafts, a second series of discs spaced axially along the other of said shafts in interlaced overlapping relation with the first series of discs, each of said discs having openings in the central region thereof, means for driving said shafts in the same direction, an inlet for light liquid and an outlet for heavy liquid at one end of said vessel, and an outlet for light liquid and an inlet for heavy liquid at the other end of said vessel.

2. In liquid-liquid contacting apparatus, an elongated vessel of generally elliptical cross section, a pair of spaced longitudinal shafts journalled in said vessel, a centrifugal impeller mounted in said vessel at one end of the first shaft, a centrifugal impeller mounted in said vessel at the other end of the second shaft, an inlet for light fluid and an outlet for heavy fluid at one end of said vessel, an inlet for heavy fluid and an outlet for light fluid at the other end of said vessel, pressure regulating means in each of said outlets, a series of discs spaced axially along one of said shafts, a second series of discs spaced axially along the other of said shafts in interlaced overlapping relation with the first series of discs, each disc having a plurality of openings in the central region thereof, and means for driving said shafts in the same direction to effect countercurrent mixing of the liquids in said vessel.

3. In liquid-liquid contacting apparatus, an elongated vessel of generally elliptical cross section, a pair of spaced longitudinal splined shafts journalled in said vessel, a centrifugal impeller mounted in said vessel at one end of the first shaft, a centrifugal impeller mounted in said vessel at the other end of the second shaft, an inlet for light fluid and an outlet for heavy fluid at one end of said vessel, an inlet for heavy fluid and an outlet for light fluid at the other end of said vessel, pressure regulating means in each of said outlets, a series of discs mounted axially along one of said splined shafts, a seris of spacers on said shaft for maintaining said discs in proper spaced relation, a second series of discs mounted axially along the other of said shafts in interlaced overlapping relation with the first series of discs, each disc having a plurality of openings in the central region thereof, spacers mounted on said second shaft for maintaining the second series of discs in proper spaced relation thereon, and means for driving said shafts in the same direction to effect countercurrent mixing of the liquids in said vessel.

4. In the art of liquid-liquid contacting, the steps which comprise effecting countercurrent flow of a light liquid and a heavy liquid through an elliptical mixing zone, centrifuging the liquids as they pass through the mixing zone to establish an interface between the light and heavy liquids which is of generally elliptical cross section, and continuously passing a film of liquid at high ve-